No. 609,343. Patented Aug. 16, 1898.
C. HARVEY.
MACHINERY FOR MAKING JOINTS BETWEEN PARTS OF CYCLE OR LIKE FRAMINGS.
(Application filed Apr. 16, 1898.)
(No Model.) 5 Sheets—Sheet 1.
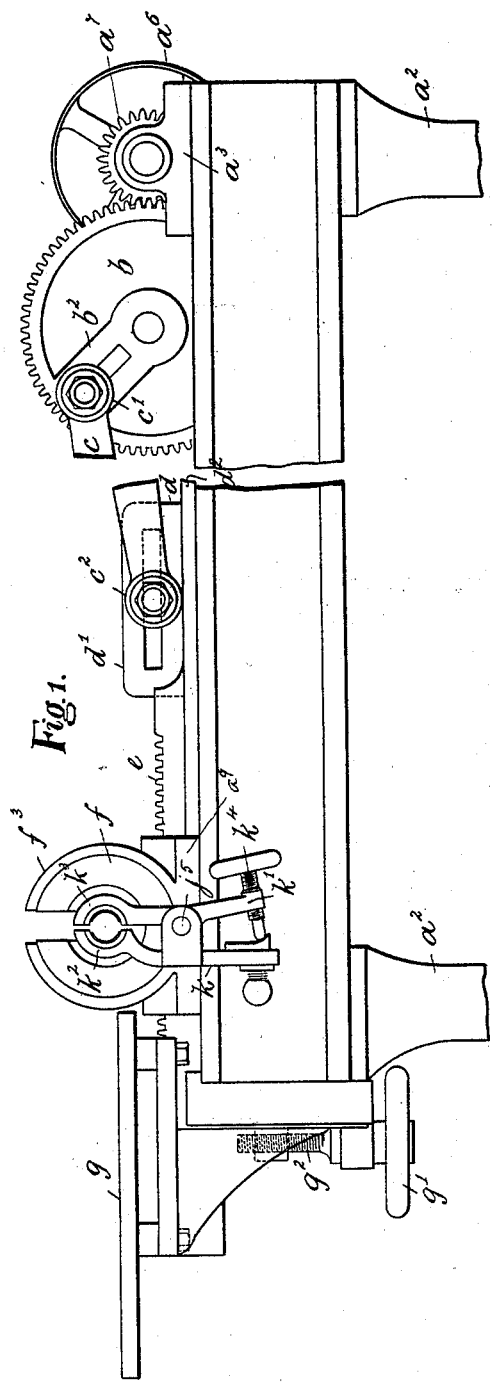
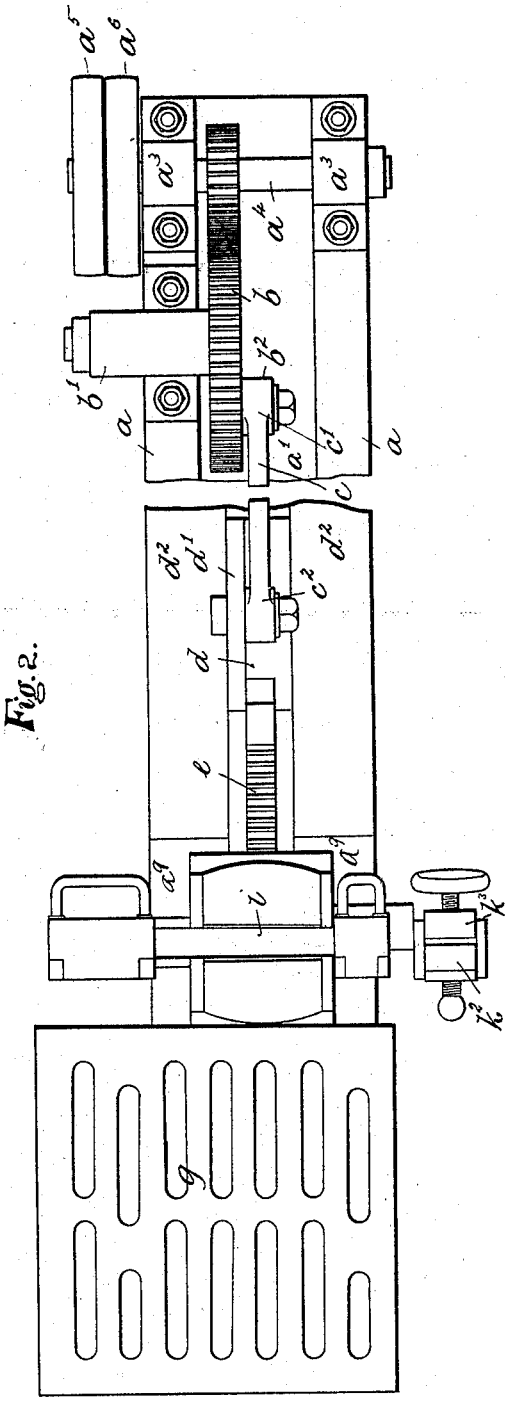
WITNESSES
INVENTOR
Charles Harvey.
By James L. Norris
Atty.
THE NORRIS PETERS CO., PHOTO-LITHO., WASHINGTON, D. C.

No. 609,343. Patented Aug. 16, 1898.
C. HARVEY.
MACHINERY FOR MAKING JOINTS BETWEEN PARTS OF CYCLE OR LIKE FRAMINGS.
(Application filed Apr. 16, 1898.)
(No Model.) 5 Sheets—Sheet 2.
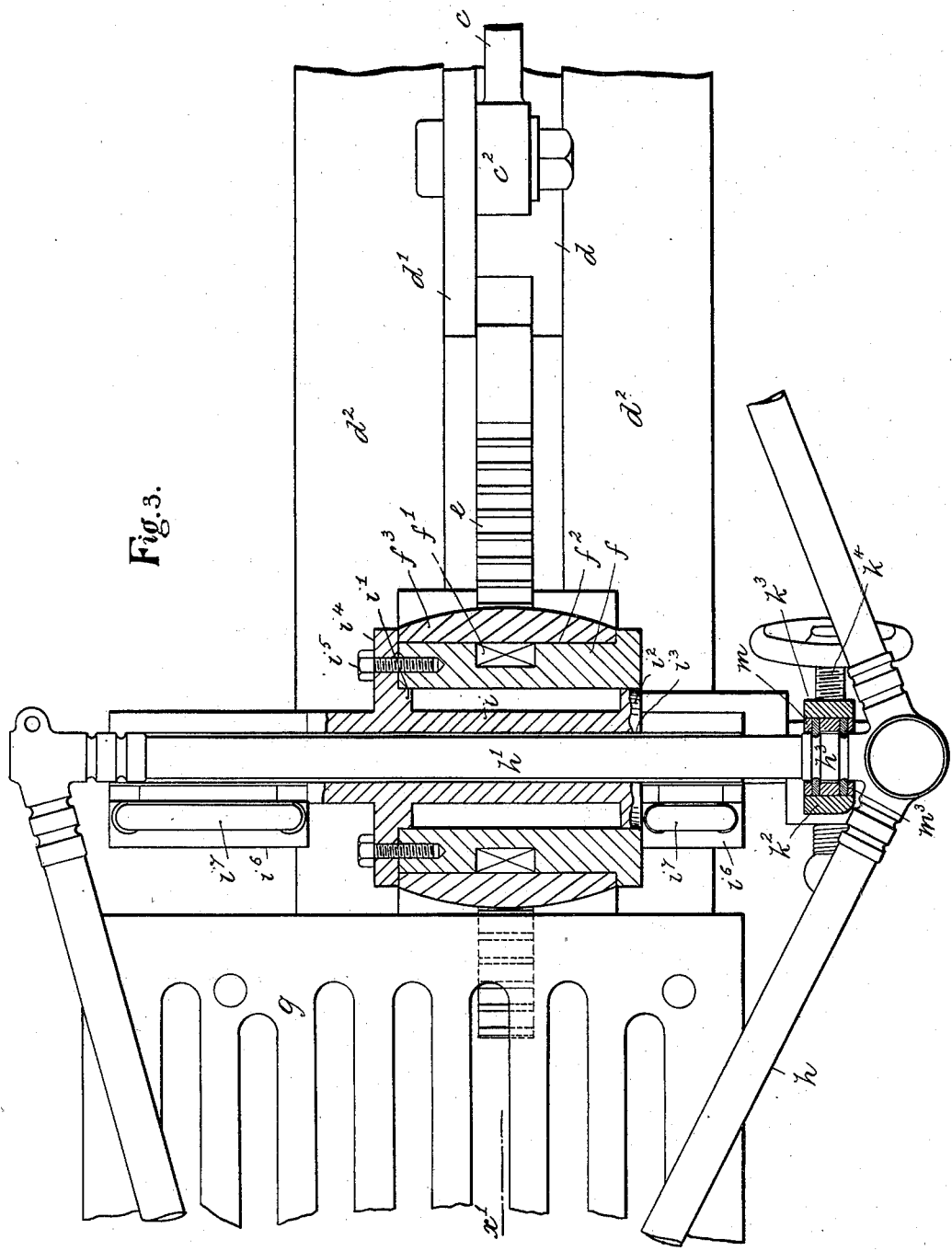
WITNESSES
INVENTOR
Charles Harvey,
By James L. Norris
Atty.

No. 609,343. Patented Aug. 16, 1898.
C. HARVEY.
MACHINERY FOR MAKING JOINTS BETWEEN PARTS OF CYCLE OR LIKE FRAMINGS.
(Application filed Apr. 16, 1898.)
(No Model.) 5 Sheets—Sheet 3.
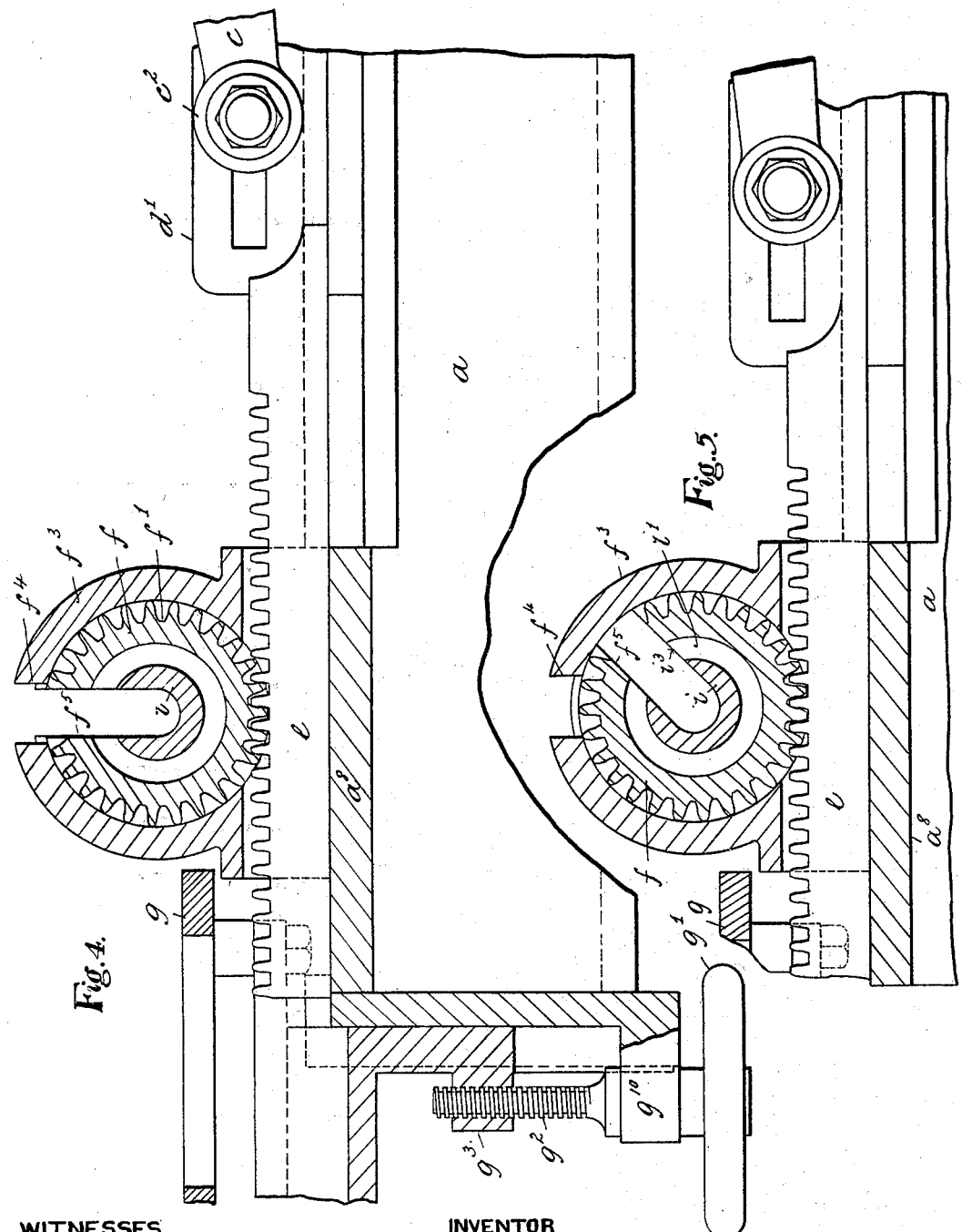
WITNESSES
INVENTOR
Charles Harvey
By James L. Norris
Atty.

No. 609,343. Patented Aug. 16, 1898.
C. HARVEY.
MACHINERY FOR MAKING JOINTS BETWEEN PARTS OF CYCLE OR LIKE FRAMINGS.
(Application filed Apr. 16, 1898.)
(No Model.) 5 Sheets—Sheet 4.
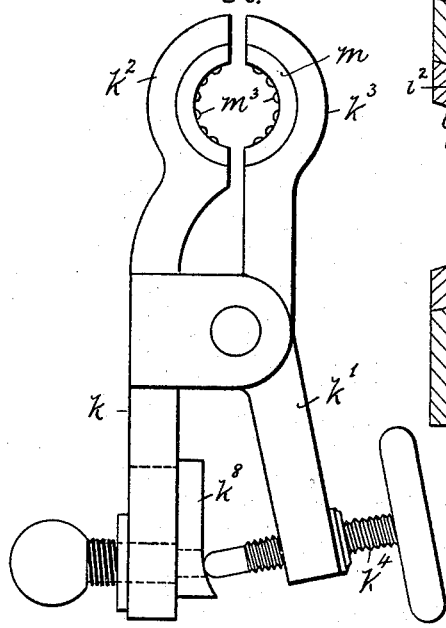
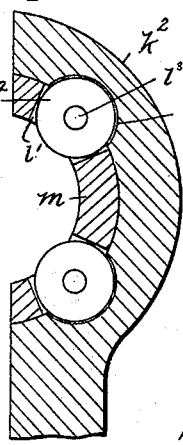
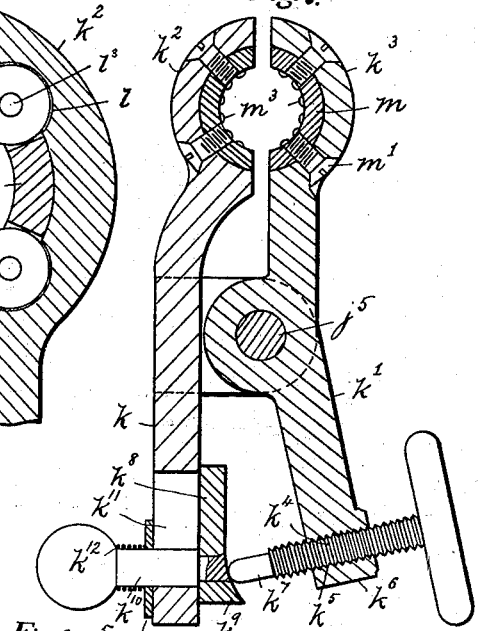
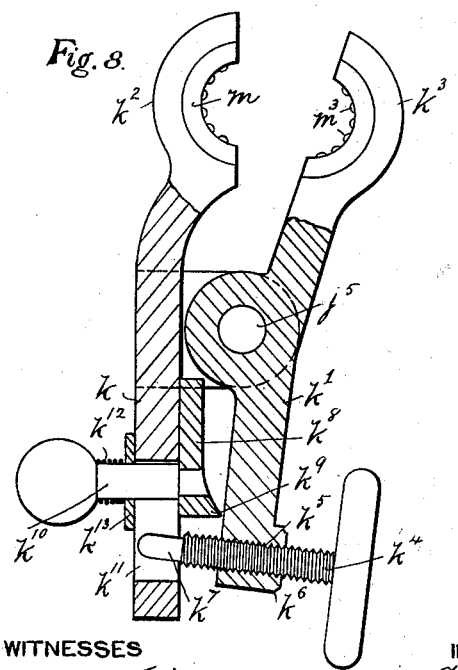
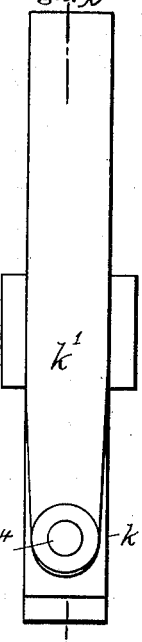
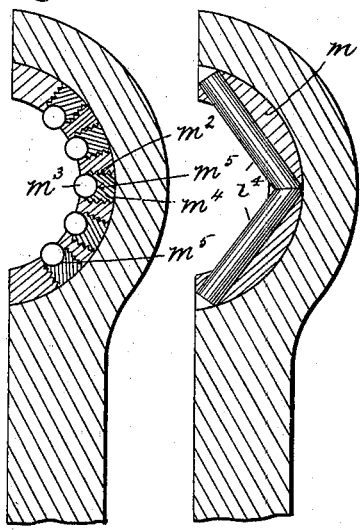
WITNESSES
INVENTOR
Charles Harvey,
By James L. Norris,
Atty.
THE NORRIS PETERS CO., PHOTO-LITHO., WASHINGTON, D. C.

No. 609,343. Patented Aug. 16, 1898.
C. HARVEY.
MACHINERY FOR MAKING JOINTS BETWEEN PARTS OF CYCLE OR LIKE FRAMINGS.
(Application filed Apr. 16, 1898.)
(No Model.) 5 Sheets—Sheet 5.
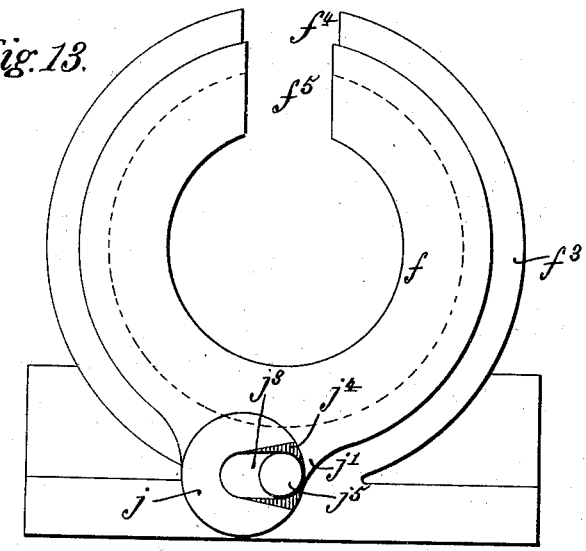
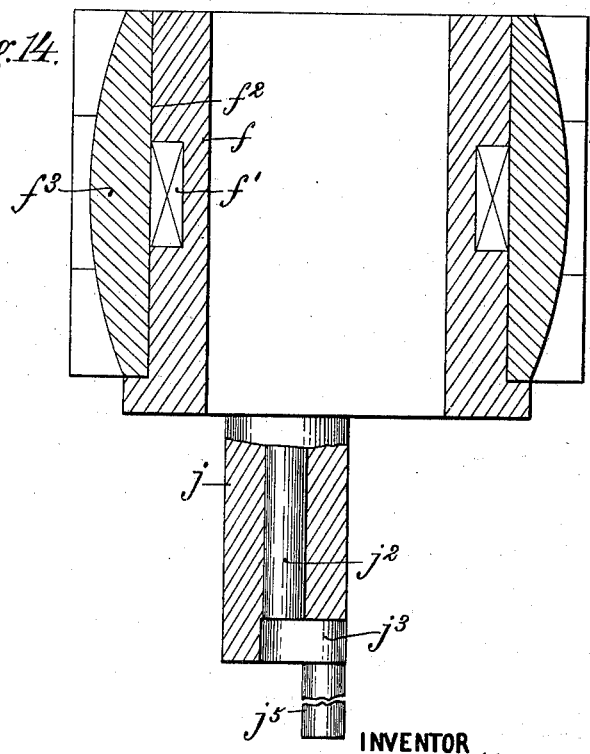
WITNESSES
INVENTOR
Charles Harvey
BY James L. Norris
ATTY.

UNITED STATES PATENT OFFICE.

CHARLES HARVEY, OF SOUTH YARDLEY, ENGLAND.

MACHINERY FOR MAKING JOINTS BETWEEN PARTS OF CYCLE OR LIKE FRAMINGS.

SPECIFICATION forming part of Letters Patent No. 609,343, dated August 16, 1898.

Application filed April 16, 1898. Serial No. 677,899. (No model.)

*To all whom it may concern:*

Be it known that I, CHARLES HARVEY, manager of works, a subject of the Queen of Great Britain, residing at "The Swifts," South Yardley, near the city of Birmingham, England, have invented certain new and useful Improvements in Machinery for Making Joints Between Parts of Cycle or Like Framings, of which the following is a specification.

This invention relates to machinery or appliances to be used in uniting or connecting tubular members to the junction lugs or sockets of cycle and analogous framings and also for uniting lengths of tubing to one another by that method wherein the union is made by a process of creasing or indenting inward at points the walls of the telescoping parts, by which inward bulging or displacement of the metal the tubular lengths are united or locked to the frame junction lugs or sockets or to one another without soldering or brazing, subsequent dressing of the joint or connection so made being therefore unnecessary.

The object of the present invention is to provide efficient means for simply and expeditiously effecting the bulging or creasing operation.

Figure 1 of the accompanying drawings represents a side elevation of a machine for forming brazeless joints between tubular members by creasing or inward annular bulgings constructed according to my invention. Fig. 2 is a top side plan of the same. This view and Fig. 1 show the parts of the machine or apparatus in their inoperative positions and without any tubular members or parts requiring to be jointed or unitedly held therein. Fig. 3 represents in top side plan, partly in horizontal section and on an enlarged scale, the table end of the machine, showing more clearly the holders for the frame, the partly-rotating slide or carrier-sleeve, and the bed or bearing wherein it works, also the rocking-tool or die-carrier jaws and the dies. A cycle-frame in which the joints are being formed is shown secured to the table and with one of the junction-lugs being acted upon to form the necessary annular grooves by the operative parts on the said tools or dies. Fig. 4 is a longitudinal vertical section of Fig. 3 upon the dotted line $x'$. The frame is not shown in this view; but the parts of the tube-rest and rotating or rocking carrier-slide are in position for receiving same. Fig. 5 is a like section as Fig. 4, but with the frame member in place and the rest and carrier-slide in a different position. Fig. 6 is a front elevation, upon an enlarged scale, of the die or tool carrying levers, which are jointed together, are capable of adjustment relative to one another, and are connected to and move with the rocking circular slide. Fig. 7 is a vertical section of Fig. 6. Fig. 8 represents, partly in elevation and partly in vertical section, the said tool-carriers, but with the jaws opened as they would be to admit of the telescoped tubular parts being introduced between or removed from them. Fig. 9 is an edge view of the said lever-arms. Fig. 10 is a vertical section of Fig. 9 upon the dotted line $x^5$, upon a further-enlarged scale, showing the construction of one form of creasing-die. Fig. 11 represents a section of another form of die. Fig. 12 is a vertical section of an inside elevation of a jaw provided with a still further modified form of contact. Fig. 13 is an end elevation, and Fig. 14 is a horizontal section of the rotating sleeve with its bearings and the center pin for carrying the tools.

The same letters of reference indicate corresponding parts in the said Figs. 1 to 14 of the drawings.

$a$ is the main bed or framing of the machine, which is slotted or has a longitudinal clearance $a'$ extending from end to end, or nearly so, and is suitably supported upon standards or feet $a^2$. Mounted in bearings $a^3$ at the right-hand end of the frame is a transverse shaft $a^4$, carrying fast and loose band-pulleys $a^5$ $a^6$ and a toothed pinion $a^7$, which gears with a larger toothed wheel $b$, suitably mounted in a bearing, such as $b'$, and having on the face of it a slotted crank-arm $b^2$, to which one end $c'$ of a connecting-rod $c$ is adjustably connected, while the other end $c^2$ of the said rod is similarly attached to a slotted extension or rib $d'$ of a sliding block $d$, to which a reciprocating movement is given on the rotation of the driving-wheel $b$. The said slide is guided in its longitudinal traverse by suitable guide-plates $d^2$, bolted or otherwise attached to the bed, and carries or has formed with it as an extension a toothed bar or rack $e$, whose bottom rests upon a solid part $a^8$ of the bed and comes between blocks $a^9$, so as to be thereby confined in the reciprocating or longitudinal to-and-fro traverse which it makes in common with the sliding block. The teeth of the said rack intergear with the teeth of an annular rack $f'$, cut around the middle of the outer periphery $f^2$ of a rotatable sleeve, drum, or carrier $f$, which is mounted loosely and is capable of being rocked or rotated within a part-circular bed or bearing $f^3$, carried on the main framing of the machine, adjacent to the slotted work-table $g$, which is made adjustable relative to the body-frame by means of a hand-wheel $g'$ and screw $g^2$, with a plain part swiveling in a boss $g^{10}$, while the screw itself passes into a screw-box $g^3$, formed in an extension of the said table, so that on the turning of the hand-wheel in either one direction or the other the screw is rotated and the table raised or lowered to a corresponding extent.

Both the bearing $f^3$ and the sleeve or carrier $f$ are transversely gapped at $f^4 f^5$, respectively, to admit of access being made to the hollow interior of the said sleeve and for the purpose of introducing a tubular member, such as $h'$, (part of which is to be operated upon by the tools,) of a cycle or like frame $h$ into the means provided for the reception of the same and for steadying and holding it while the joint is being made. This consists of a trough or semicircular sectioned rest $i$, having flanges or enlargements $i' i^2$, gapped at $i^3$ to correspond with the gaps $f^4 f^5$ and being of such a diameter as to fit into and close the open ends of the carrier-sleeve, and also with a further gapped flange $i^4$, abutting against one end of the sleeve and being secured thereto by means of bolts $i^5$, so that the tube-rest and slide are thereby made fast to one another and partake of the same rocking or part-rotating movement. Outward of the flanges the rest is provided with hinged covers or lids $i^6$, having handles or grips $i^7$ and adapted when closed over the rest to keep the tube down in its place.

The front end of the rocking sleeve carries an eccentrically-disposed bush or hollow boss $j$, the said bush being, in fact, carried upon an extension $j'$ from the edge of the said sleeve, and within the bush $j$ is an axis or spindle $j^2$, free to turn slightly therein and having at its outer end a crank $j^3$, confined within a recess $j^4$ in the end of the boss and being provided with a peg or center pin $j^5$, which is thus capable of slight vertical change of position in the recess and whereon the pair of arms $k\ k'$, carrying the impressing dies or tools, are mounted. The arm $k$ may be fixed or stationary relative to the other one, $k'$, which may turn upon the center pin, so as to admit of the jaw $k^3$ at its upper end being brought nearer to or taken farther away from the jaw $k^2$ at the top of the fixed arm for varying or adjusting the grip or nip of the impressing-tools on the parts being joined. The closing together of the jaws for increasing the grip is effected by means of a rotating screw $k^4$, passed through a screw-box $k^5$ on the tail end $k^6$ of the movable arm and having its end $k^7$ impinging upon a bearing-block $k^8$, carried by the tail or lower end of the fixed arm, being formed with a foot or extension $k^9$, which provides an extended bearing for the impinging end of the screw, while in order to allow for the expeditious opening out of the jaws on the completion of a joint or to admit of the same being fully opened without having to turn back the screw for a considerable distance this bearing-block is made to slide vertically up the inside of the arm by being carried upon a pin or stud $k^{10}$, working in a vertical clearance or gap $k^{11}$ of such a width that the end of the screw $k^4$ may easily pass therethrough. A spring $k^{12}$ encircles the stud (on which a washer $k^{13}$ is also threaded) and by its expansive action serves to stiffen the movement of the bearing-block. By this arrangement when the jaws require to be opened the screw has only to be slacked back just sufficient distance to clear the foot of the block, when the said block can be raised, leaving the bottom portion of the gap $k^{11}$ open and into which the end of the screw can pass, as seen in Fig. 8, on the opening out of the jaws by the turning of the movable arm on its joint. The jaws of these adjustable arms are curved and are so arranged that their axes shall come in the same axial line as the common center of troughed tube-rest, the rocking sleeve, and its bearing, so that a tube placed within the aforesaid also comes within the nip of the jaws wherein the half die-plates $m$ are mounted and secured by screws $m'$. These plates in the form shown in Figs. 6 and 10 are pierced with a number of annular series of holes $m^2$ (corresponding to the creasings or annular impressions to be made) and through which portions of a number of roller contacts or balls of hardened steel $m^3$, constituting the impressing or grooving expedients, extend, being kept in position and adjusted when required by screws $m^4$, which screw into the holes $m^2$ and have their inner ends $m^5$ sunken to receive the ball contacts, which are each free to revolve or roll in their respective containing-chambers.

Operation: Assuming that the parts of the machine are in the positions represented in Figs. 1 and 2 and that a joint or junction between a tubular member of a cycle-frame and one of the junction-lugs requires to be made by forming impressed annular bulgings in both parts, the machine is moved by hand or otherwise to such a position that the gaps $f^5 i^3$ in the walls of the rocking carrier $f$ and the flanges $i' i^2$ of the tube-rest $i$ coincide with the gap $f^4$ of the bearing $f^3$, as represented in Fig. 4. The covers $i^6$ are then turned back, and next the tube $h'$, forming a part of a cycle-frame which is held stationary by being bolted or otherwise secured to the table $g$, whose end telescopes or sockets into a junction-lug, such as $h^3$, is dropped into or slid onto the rest, being further steadied in this position by turning over the lids, whose insides are channeled to fit onto the tube. The lug $h^3$, telescoped by the tube, is now brought between the half-section dies $m$ in the jaw ends $k^2\ k^3$ of the tool arms or levers $k\ k'$, the jaws being brought concentric with the lug, should they not be so in the first instance, by bodily raising or lowering the arms by moving the crank $j^3$, carrying the center pin $j^5$, to the required extent within the limiting-recess $j^4$. This adjustment having been effected, the jaws are made to approach one another and close around the lug, so as to bring the impressing-rollers into intimate contact therewith, by screwing in the screw $k^4$. The driving-band is now thrown onto the fast pulley, and the pinion $a^7$ is rotated, communicating its motion to the toothed wheel $b$, which in turn, by means of the connecting-rod $c$, transmits a traversing movement to the sliding block $d$ and to the rack $e$, intergearing with the toothed annulus $f'$ of the carrier-sleeve $f$, which is caused to rock or make partial rotations within its bearing $f^3$ and to carry with it the stud or center pin $j^5$, whereon the the tool-arms are mounted. The consequence is that the jaws of the arms and the impressing-roller contacts thereof make corresponding partial rotations or are rocked backward and forward around the stationary lug or tube end as a center, which are thereby annularly creased or inwardly impressed at separated points, the number of impressions corresponding to the number of rows of contacts mounted in the dies, and as the impressing proceeds and the grooves or impressions become deeper the contacts are made to follow them up by the jaws being made to gather closer around them by turning the screw $k^4$ more and more inward and causing the tail ends of the arms $k\ k'$ to become farther separated. When the metal of the telescoping parts has been sufficiently bulged inward to form a secure joint, the screw $k^4$ is slacked back sufficient to clear the foot extension of the bearing-block $k^3$, which is then slid upward, when the jaws open out and admit of the joined parts being removed.

As shown in Fig. 11, $k^2$ is the jaw, and $m$ the die-plate, both being gapped, respectively, at $l\ l'$ to receive contact-rollers $l^2$, which have pivots or trunnions $l^3$, adapted to turn freely in suitable bearing-gaps made to receive them in the die-plates.

As shown in Fig. 12, $m$ is the die-plate, and $l^4$ the impressing medium, consisting of diagonally-disposed ribs or lengths of metal let into the die-plates, and which may either be fixed as shown or may be provided with trunnion or other ends to admit of their rotating within suitable bearings.

Having fully described my invention, what I desire to claim and secure by Letters Patent is—

1. In machinery for making brazeless joints between telescoping metallic parts by means of annularly impressing or creasing the metal, the combination with pivoted lever-arms having jaws carrying impressing dies or tools, of means for bringing said jaws together comprising an adjusting-screw carried by one of said arms, and a bearing-block for said screw slidably supported in the opposite arm, substantially as described.

2. In machinery for making brazeless joints between telescoping metallic parts by means of annularly impressing or creasing the metal, the combination with a tool-carrier and means for imparting a rocking or part-rotating movement thereto, of a center pin or peg eccentrically mounted on the face of said tool carrier or block, lever-arms pivotally supported on said center pin or peg, and having jaws carrying impressing dies or tools, and means for adjusting said jaws toward or from each other, substantially as described.

3. In machinery for making brazeless joints between telescoping metallic parts by means of annularly impressing or creasing the metal, the combination with a bearing having a tool-carrier mounted therein, and means for rocking or partly rotating said carrier, of a cylindrical boss eccentrically mounted on the face of the said tool-carrier and having in its outer end a recessed portion, a rod journaled in said boss and having at its outer end a crank located in said recessed portion and capable of a slight rising or falling movement therein, a center pin or peg carried by said crank, lever-arms pivotally mounted on said center pin or peg and having jaws carrying impressing dies or tools, and means for adjusting said jaws toward or from each other, substantially as described.

4. In machinery for making brazeless joints between telescoping metallic parts by means of annularly impressing or creasing the metal, the combination with the bearing of a circular tool-carrier mounted therein having its periphery provided with gear-teeth, a rack-bar engaging said teeth and means for reciprocating said rack-bar whereby to rock or partly rotate said tool-carrier, a center pin or peg eccentrically and adjustably mounted on the face of a tool-carrier or sleeve, lever-arms pivotally supported on said center pin or peg and having jaws carrying impressing tools or dies, and means for adjusting said jaws toward or from each other, substantially as described.

5. In machinery for making brazeless joints between telescoping metallic parts by means of annularly impressing or creasing the metal, the combination with the bed of the machine, of a cylindrical bearing mounted thereon having a transverse slot, a cylindrical tool-carrier mounted in said bearing and having a transverse slot adapted to coincide with the slot in the bearing, a tube-rest located within said tool-carrier and having one end extending beyond the same and being bolted to said tool-carrier to turn therewith, said tube-rest having a slot coinciding with the slot in the tool-carrier, means for securing a tube in said rest, means for imparting a rocking or part-rotating movement to the tool-carrier, a center pin or peg eccentrically and adjustably mounted on the face of the tool-carrier, lever-arms pivotally supported on said center pin or peg and having jaws carrying impressing tools or dies, and means for adjusting said jaws toward or from each other, substantially as described.

6. A tool for annularly impressing or creasing metal tubing comprising lever-arms pivotally united intermediate their ends and having at their outer ends semicircular jaws, die-plates secured in said jaws and carrying inpressing tools or dies, and an adjusting-screw carried by one arm and bearing against the opposite arm for bringing the jaws together, substantially as described.

In testimony whereof I have hereunto set my hand in presence of two subscribing witnesses.

CHARLES HARVEY.

Witnesses:
 HENRY SKERRETT,
 WILLIAM H. LONG.